Aug. 21, 1951    H. RYBERG    2,564,860

SACHET

Filed March 27, 1946

Inventor
Henry Ryberg,
By Bailey, Stephens & Huettig
his Attorneys

Patented Aug. 21, 1951

2,564,860

UNITED STATES PATENT OFFICE 2,564,860

SACHET

Henry Ryberg, Brooklyn, N. Y.

Application March 27, 1946, Serial No. 657,550

4 Claims. (Cl. 299—24)

This invention is a sachet, and more particularly a sachet which is compact and will give off perfumed scents for a long period of time.

Ordinarily, sachets are composed of porous bags filled with scent giving substances such as flower petals or aromatic herbs. These sachets are bulky and are able to give off a pleasant scent for only a relatively short length of time.

It is an object of this invention to produce a sachet which is small and compact, and which will produce a pleasant scent for a considerable length of time.

Other objects obtained will become apparent in the subsequent description of the invention.

Generally the objects of the invention are obtained by forming a block in any desired shape of an absorbent material, such as a diatomaceous earth, mixed with a suitable binder, and impregnating the block with a perfumed liquid. The block can be covered on its outer surfaces with porous material such as cloth, or wire screening, or can be packed in a container having holes therein to permit passage of the scent. As the perfumed diatomaceous earth yields the scent slowly, especially because of the binder, and the covering if one is used, the sachet thus formed has a much greater lasting effect than the prior known sachets. It has been found that sachets constructed according to this invention are particularly useful for ladies' handbags as they need be no larger than an inch or so in diameter and weigh but a few ounces. These sachets are also useful in a suitcase, a bureau drawer, or any other place wherein a pleasant scent is desired.

The invention is further described with reference to the accompanying drawing in which.

The block which is to be impregnated with perfume is composed of a lightweight porous medium mixed with a suitable binder. The lightweight porous medium may be a diatomaceous earth such as diatomite, although other porous and absorbent materials such as fuller's earth, wood pulp and the like can be used. Calcined calcium sulphate, commonly known as plaster of Paris, has served as a satisfactory binder when mixed in the ratio of approximately two-thirds plaster of Paris to one-third calcined diatomaceous silica by weight. This mixture will absorb about two-thirds of its weight of water without disintegrating. As the lasting effect of the sachet increases as the ability of the sachet to absorb perfumed liquid increases, it is readily seen that the composite block of this invention has unexpectedly large absorbent qualities for a sachet.

Although the block made as described is strong enough to be useful per se, it is subject to dusting when rubbed. Consequently some form of moisture pervious covering for the block is desirable. Such covering may be in the form of cloth, metal or plastic screens, metallic particles, or a container. When the latter is used, the advantage lies in that it may also form the mold for casting the block of absorbent material and binder.

Figure 1:
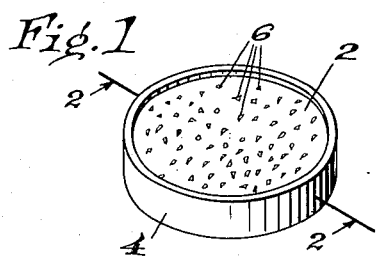
Fig. 1 is a perspective view of one form of the invention.
Figure 2:
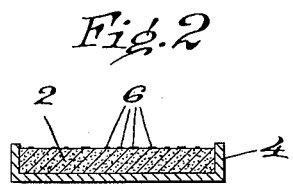
Fig. 2 is a cross-section view taken on the line 2—2 of Fig. 1.

In Figs. 1 and 2 of the drawings, the material forming the block 2 has been cast into a container 4 which may be of wood, metal, or plastic. The upper surface of block 2 is the only exposed surface and thus the perfumed scents are limited to that surface in their escape from the block. The tendency of this surface to dust is lessened by embedding small metal flakes 6 in the material forming the surface of block 2. An ornamental effect may also be achieved by the flakes 6 as they may be varicolored, and arranged at random, or in pattern. These flakes do not form an impervious covering, but are so separated that the perfume can escape slowly from the container.

Figure 3:
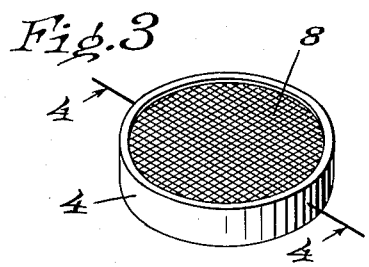
Fig. 3 is a perspective view of another form of the invention.
Figure 4:
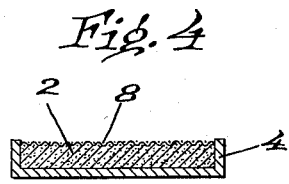
Fig. 4 is a cross-section view taken on the line 4—4 of Fig. 3.

In Figs. 3 and 4 of the drawings, the metal flakes 6 of Figs. 1 and 2 are replaced by a wire mesh screen 8.

Figure 5:
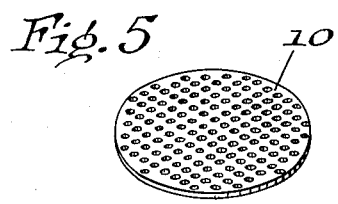
Fig. 5 is a perspective view of a modified form of covering material used in the invention.
Figure 6:
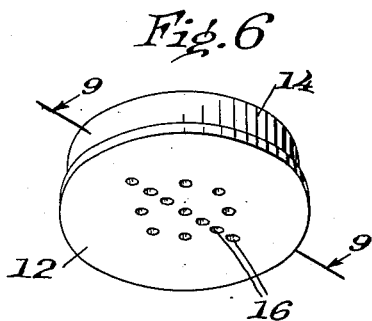
Fig. 6 is a perspective view of another form of the invention.
Figure 7:
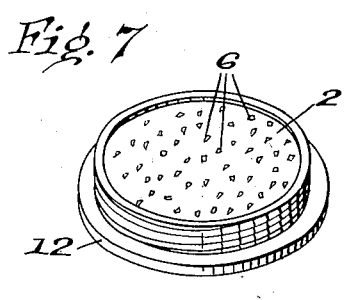
Fig. 7 is a perspective view of the base element of Fig. 6.
Figure 8:
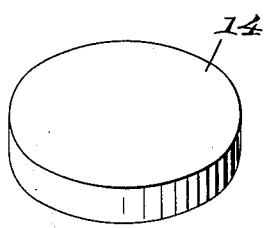
Fig. 8 is a perspective view of the cap element for the base shown in Fig. 7.
Figure 9:
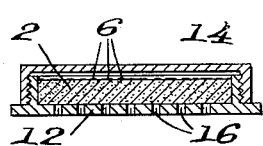
Fig. 9 is a cross-section view taken on the line 9—9 of Fig. 6.

Likewise, as seen in Fig. 5, the wire mesh of Figs. 3 and 4 can be replaced by a perforated plate 10.

In Figs. 6 to 10, inclusive, the block 2 is encased by a container having a base section 12 and a cap 14 adapted to threadedly engage base 12. The upper surface of block 2 is covered with metal flakes 6, while base 12 is provided with perforations 16 through which the scent escapes from the sachet.

In operation, a sachet in any of the forms described is first formed, and then impregnated with perfumed liquid. Without further treatment it may then be placed in a handbag, suitcase, bureau drawer, or the like, and the scent from the absorbed liquid will slowly escape from the sachet. When the perfumed liquid has evaporated from the sachet, more liquid can be added, and by thus doing, the sachet used over and over again.

A sachet according to any one of the above described modifications, or equivalent variations thereof, will achieve the objects of the invention.

Having now described my invention, I claim:

1. A sachet composed of a container closed on the sides and bottom and open at the top, a filling of a liquid absorbent material composed of one-third calcined diatomaceous silica and two-thirds calcined calcium sulfate by weight in said container, means for perfuming said material, and means providing a porous layer on the surface of said material at the open end of said container.

2. A sachet as in claim 1, said porous layer means comprising metallic flakes.

3. A sachet as in claim 1, said porous layer means comprising a screen.

4. A sachet as in claim 1, said porous layer means comprising a perforated sheet of material.

HENRY RYBERG.

REFERENCES CITED

The following references are of record in the file of this patent:

UNITED STATES PATENTS

| Number | Name | Date |
|---|---|---|
| 977,374 | De Lano | Nov. 29, 1910 |
| 1,732,028 | Reiner | Oct. 15, 1929 |
| 1,871,418 | McKee | Aug. 9, 1932 |
| 1,907,809 | Hessel | May 9, 1933 |
| 1,931,132 | Hinckley | Oct. 17, 1933 |
| 1,988,141 | Schaller | Jan. 15, 1935 |
| 2,120,020 | Coulter | June 7, 1938 |
| 2,277,377 | Warner | Mar. 24, 1942 |
| 2,294,232 | Halpert | Aug. 25, 1942 |